(12) United States Patent
Liu et al.

(10) Patent No.: US 10,541,856 B2
(45) Date of Patent: Jan. 21, 2020

(54) NAN SCHEDULE MIGRATION

(71) Applicant: Apple Inc., Cupertino, CA (US)

(72) Inventors: Yong Liu, Campbell, CA (US);
Christiaan A. Hartman, San Jose, CA (US); Lawrie Kurian, San Jose, CA (US); Peter N. Heerboth, San Jose, CA (US)

(73) Assignee: Apple Inc., Cupertino, CA (US)

(*) Notice: Subject to any disclaimer, the term of this patent is extended or adjusted under 35 U.S.C. 154(b) by 148 days.

(21) Appl. No.: 15/710,988

(22) Filed: Sep. 21, 2017

(65) Prior Publication Data

US 2018/0123860 A1 May 3, 2018

Related U.S. Application Data

(60) Provisional application No. 62/414,846, filed on Oct. 31, 2016.

(51) Int. Cl.
*H04L 29/08* (2006.01)
*H04W 84/12* (2009.01)
*H04W 48/16* (2009.01)

(52) U.S. Cl.
CPC ....... *H04L 29/08306* (2013.01); *H04W 84/12* (2013.01); *H04W 48/16* (2013.01)

(58) Field of Classification Search
None
See application file for complete search history.

(56) References Cited

U.S. PATENT DOCUMENTS

| 5,724,665 | A | 3/1998 | Abbasi et al. |
| 6,831,904 | B1 | 12/2004 | Yamao et al. |
| 2005/0111383 | A1 | 5/2005 | Grob et al. |
| 2016/0249200 | A1* | 8/2016 | Liu ............... H04W 8/005 |

* cited by examiner

*Primary Examiner* — Brian Whipple
(74) *Attorney, Agent, or Firm* — Kowert Hood Munyon Rankin and Goetzel PC; Jeffrey C. Hood; Brian E. Moore

(57) ABSTRACT

Embodiments relate to wireless stations that operate to configure direct communication between the wireless stations without utilizing an intermediate access point. In embodiments, a wireless station may establish a peer-to-peer communication schedule with at least one neighboring peer wireless station, announce, to the at least one neighboring peer wireless station, a schedule transition (or migration), wherein the schedule transition includes an effective time of a new schedule, and announce, to the at least one neighboring peer wireless station, the new schedule at the effective time.

20 Claims, 12 Drawing Sheets

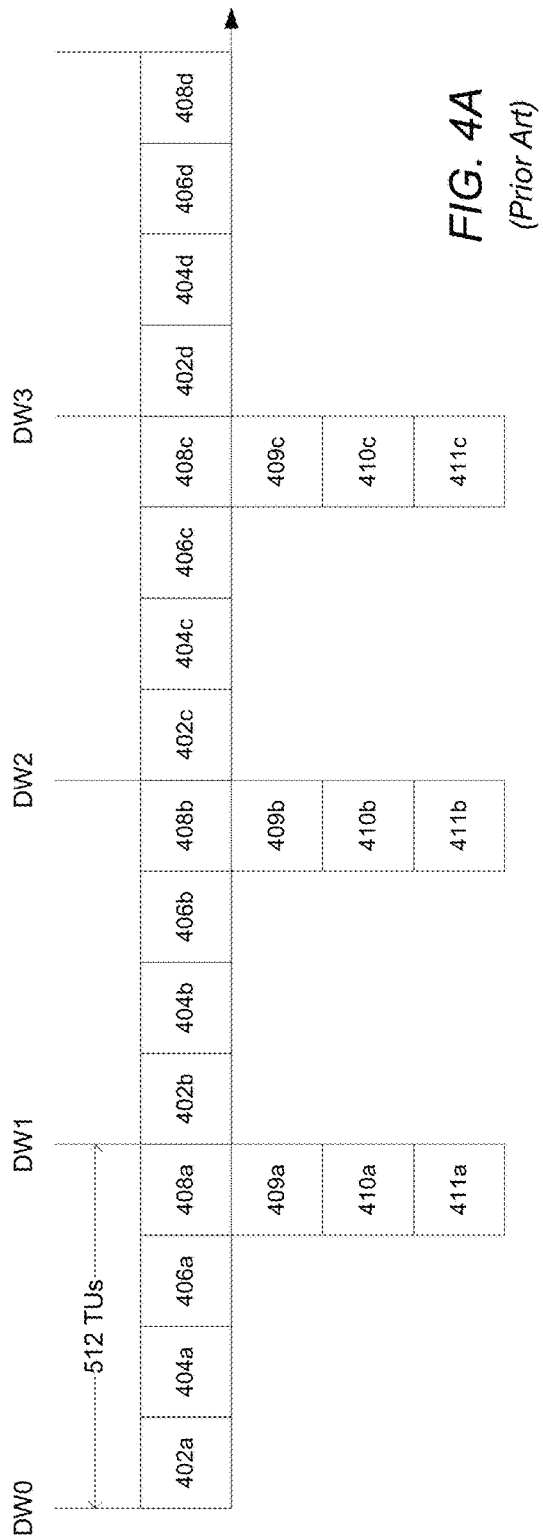

Time Window 440

| Time Bitmap Control 442 | | | | Time Bitmap Length 444 | Time Bitmap 446 |
|---|---|---|---|---|---|
| Bit Duration 442a | Period 442b | Start Offset 442c | Reserved 442d | | |
| 3 (bits) | 3 (bits) | 9 (bits) | 1 (bit) | 9 (bits) | Variable |

FIG. 4D
*(Prior Art)*

| Band Entry 450a | Band Entry 450b | Band Entry 450c |
|---|---|---|
| Band ID 451a | Band ID 451b | Band ID 451c |
| 1 (byte) | 1 (byte) | 1 (byte) |

FIG. 4E
*(Prior Art)*

Channel Entry List 452

| Operating Class 452a | Channel Bitmap 452b | Primary Channel Bitmap 452c | Auxiliary Channel Bitmap 452d |
|---|---|---|---|
| 1 (byte) | 2 (bytes) | 1 (byte) | 2 (bytes) |

FIG. 4F
*(Prior Art)*

NAN SCHEDULE MIGRATION

PRIORITY DATA

This application claims benefit of priority to U.S. Provisional Application Ser. No. 62/414,846, titled "NAN Schedule Migration," filed Oct. 31, 2016, by Yong Liu, Christiaan A. Hartman, Lawrie Kurian, and Peter N. Heerboth which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and/or multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, a device that wirelessly connects to other devices is referred to as a "station" or STA, "mobile station", "user device" or "user equipment" or UE for short. Wireless stations can be either wireless Access Points (APs) or wireless clients (or mobile stations). APs, which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices, such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in setup and coordination of the communication between such devices.

SUMMARY

Embodiments described herein relate to systems and methods for peer devices to transition from an existing schedule, e.g., a peer-to-peer communication schedule, to a new schedule.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein. In some embodiments, one or more wireless stations operate to configure direct communication with neighboring mobile stations, e.g., direct communication between the wireless stations without utilizing an intermediate access point. Embodiments of the disclosure relate to a mechanism for peer devices to establish a peer-to-peer communication schedule with at least one neighboring peer device, announce, to the at least one neighboring peer device, a schedule transition (or migration), wherein the schedule transition includes an effective time of a new schedule, and announce, to the at least one neighboring peer device, the new schedule at the effective time.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example of an availability schedule for peer-to-peer communication, according to implementations.

FIG. 4B illustrates an example of a NAN availability attribute, according to implementations.

FIG. 4C illustrates an example of an availability entry list attribute, according to implementations.

FIG. 4D illustrates an example of a time window attribute, according to implementations.

FIG. 4E illustrates examples of band entry attributes, according to implementations.

FIG. 4F illustrates an example of a channel entry attribute, according to implementations.

Figure 1:
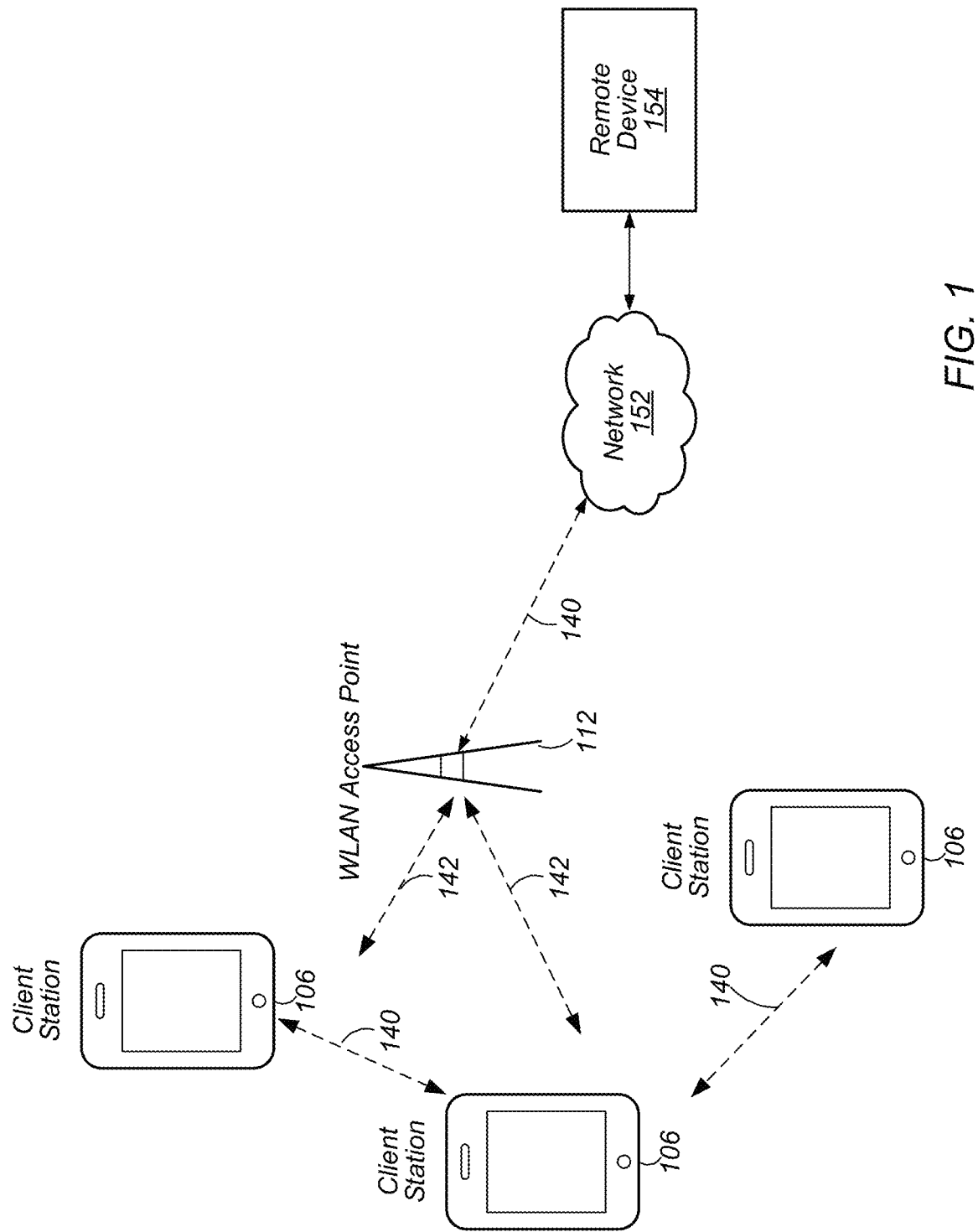
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to establish a peer-to-peer communication schedule with at least one neighboring peer device, announce, to the at least one neighboring peer device, a schedule transition (or migration), wherein the schedule transition includes an effective time of a new schedule, and announce, to the at least one neighboring peer device, the new schedule, e.g., at the effective time.

Figure 2:
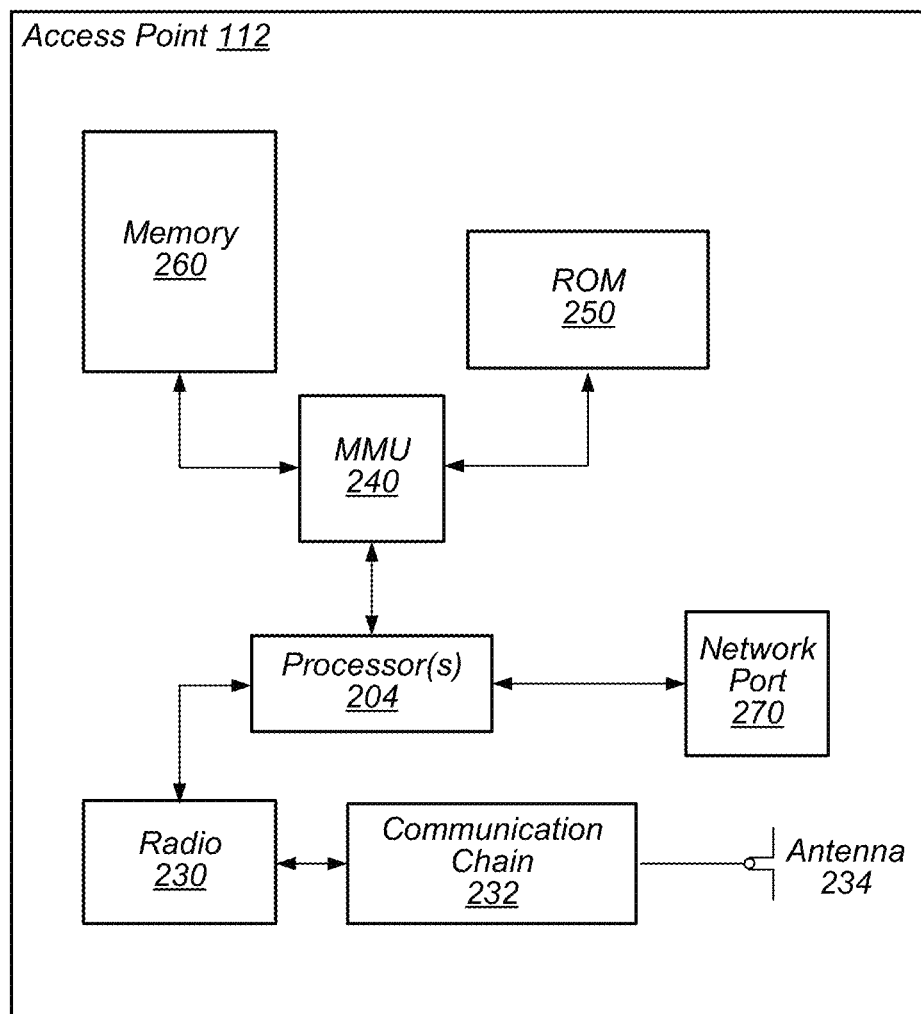
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to establish a peer-to-peer communication schedule with at least one neighboring peer device, announce, to the at least one neighboring peer device, a schedule transition (or migration), wherein the schedule transition includes an effective time of a new schedule, and announce, to the at least one neighboring peer device, the new schedule, e.g., at the effective time.

Figure 3:
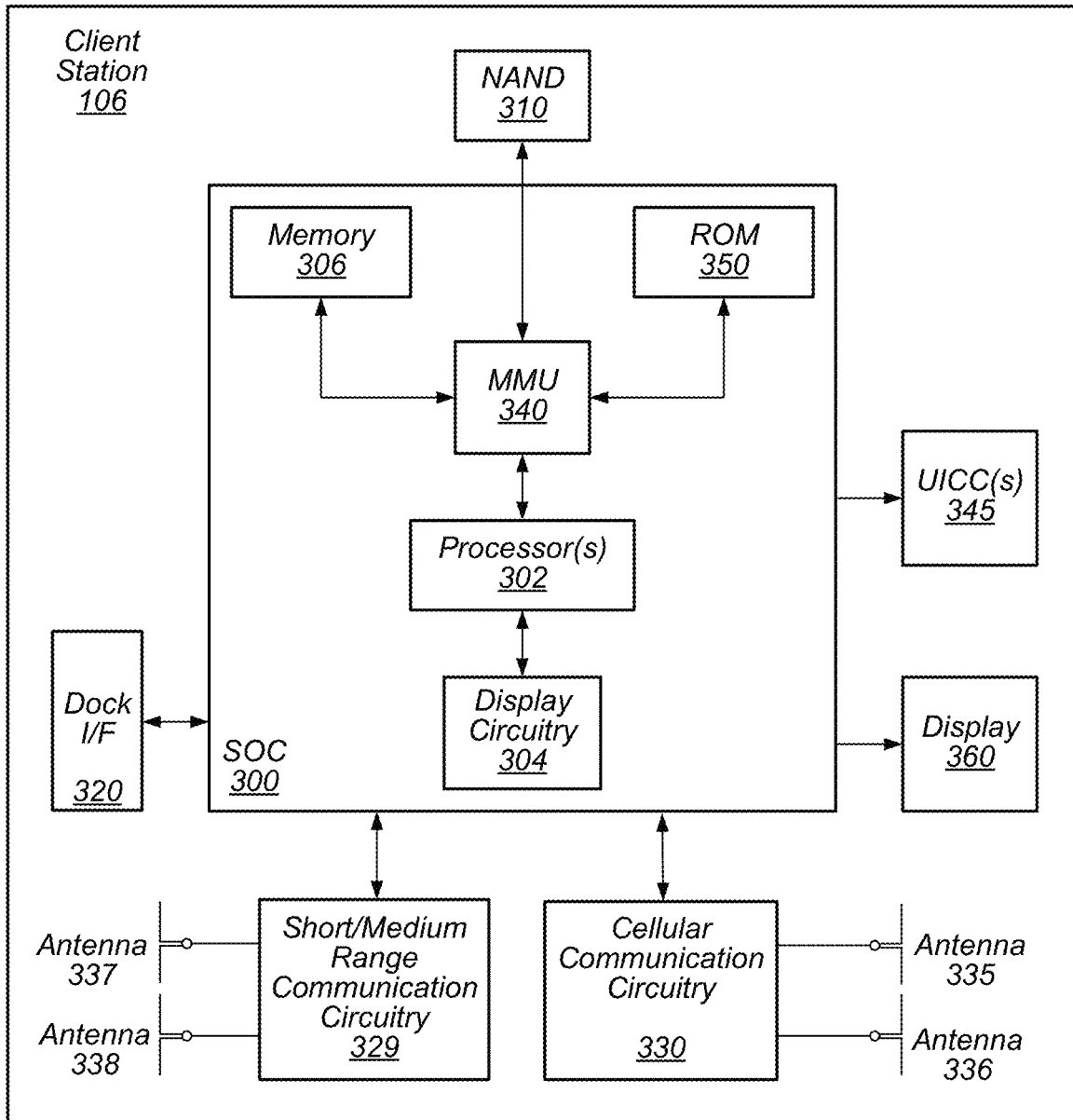
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to establish a peer-to-peer communication schedule with at least one neighboring peer station, announce, to the at least one neighboring peer station, a schedule transition (or migration), wherein the schedule transition includes an effective time of a new schedule, and announce, to the at least one neighboring peer station, the new schedule, e.g., at the effective time.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein further define methods for peer to peer devices to announce transition to new and/or updated schedules.

Schedule Migration

In some existing implementations, a device (e.g., a NAN device) may publish to neighboring devices (e.g., neighboring NAN devices) an availability schedule. The availability schedule may include scheduled availability, e.g., for up to sixteen discovery window (DW) intervals, where each DW interval is 512 time units (TUs). Thus, an availability schedule may include scheduled availability, e.g., for up to 8,192 TUs, hereinafter referred to as a discovery window schedule (DWS) interval. In other words, 1 DWS interval can span 8,192 TUs and includes 16 DW intervals, each DW interval spanning 512 TUs. The 16 DWs within a DWS interval are numbered sequentially from DW0 to DW15, with each DWS interval started by a DW0. As illustrated by FIGS. 4A-F, an availability schedule may include availability windows across multiple channels (e.g., entries 402a-d correspond to channel 6, entries 404a-d correspond to channel 149, and so forth). In addition, the availability schedule may include additional entries 406a-d, 408a-d, and channel variations such as entries 409a-c, 410a-c, and 411a-c. The availability windows may be indicated as periodic (e.g., repeating every 256 TUs, every 512 TUs, every 1024 TUs, and so forth) and may include an offset from the beginning of current DWS interval (e.g. the start of DW0 of current DWS interval). The availability windows may be indicated via one or more availability entries included in a NAN availability attribute, e.g., such as NAN availability attribute 420 illustrated by FIG. 4B. The NAN availability attribute 420 may indicate a schedule that covers the current DWS interval, e.g., starting from a beginning of an immediately previous DW0 (and repeated every DWS interval, as specified) and lasting up to 1 DWS interval (e.g., 8,192 TUs). The indicated schedule may occur once or may be repeated, e.g., until an update. The NAN availability attribute 420 may include an availability entry list 430, e.g., as illustrated by FIG. 4C, that includes one or more parameters such as length parameter 432, entry control parameter 434, time window parameter 440, e.g., as illustrated by FIG. 4D, band entry parameter 450, e.g., as illustrated by FIG. 4E, and/or channel entry attribute 452, e.g., as illustrated by FIG. 4F. The time window parameter 440 may include one or more parameters, such as a time bitmap control parameter 442, a time bitmap length parameter 444, and/or a time bitmap 446. The time bitmap control parameter 442 may include any/all of a bit duration field 442$a$, a period field 442$b$, a start offset field 442$c$, and a reserved field 442$d$. The bit duration field 442$a$ may indicate the duration of the time bitmap unit (e.g., 16 TU, 32 TU, 64 TU, 128 TU, and so forth) and the period field 442$b$ may indicate a repeat interval (e.g., 128 TU, 256 TU, 512 TU, and so forth up to 8,192 TU) of the time bitmap. The start offset field 442$c$ may indicate an offset (e.g., 16 TU, 32 TU, 48 TU, and so forth up to 8,192 TU) relative to a start of a current DWS interval. The band entry parameter 450($a$-$c$) may include one or more parameters such as band identifier (ID) 451($a$-$c$). The channel entry attribute 452 may include one or more fields such as any/all of operating class field 452$a$, channel bitmap field 452$b$, primary channel bitmap field 452$c$, and auxiliary channel bitmap field 452$c$.

Figure 5:
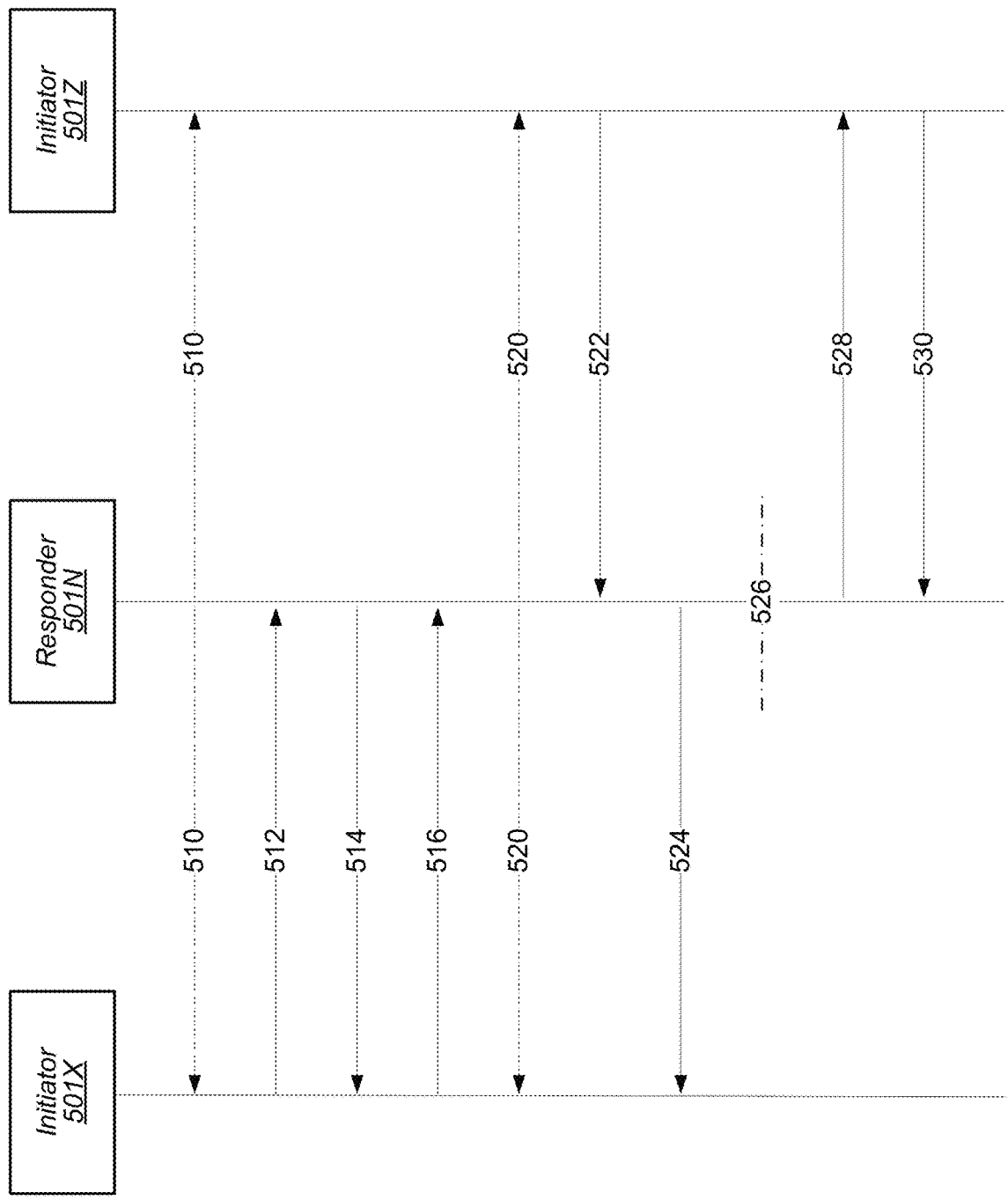
FIG. 5 illustrates an example of signaling to establish and update peer-to-peer schedules, according to implementations.

In some implementations, e.g., as illustrated by FIG. 5, a device such as device 501N may have established peer-to-peer communications (and corresponding communication schedules, e.g., as specified by NAN availability attributes) with multiple peer devices, such as device 501X. In addition, device 501N may attempt to initiate a new peer-to-peer communication with device 501Z and may further need to change and/or update its schedule to accommodate the new peer-to-peer communication with device 501Z. Thus, device 501N must notify device 501X of the changed/updated schedule and additionally indicate an effective time of the changed/updated schedule.

For example, as illustrated by FIG. 5, device 501N may transmit a beacon or publish message 510 that may include a first schedule. The first schedule may indicate device 501N's potential availability. Note that potential availability may refer to time windows and channels for receiving transmissions that are either preferred or not preferred. The beacon/publish message 510 may be received by multiple peers, such as devices 501X and 501Z. A first device, e.g., device 501X, may respond with a schedule request 512 for a peer-to-peer communication session. Device 501N may then respond with a schedule request response 514 that includes a second schedule that may indicate device 501N's conditional availability for device 501X and potential availability. Note that conditional availability may refer to proposed time windows and channels for communication with a peer and may become committed if the peer accepts the proposal (either entirely or partially). In addition, conditional availability may only be included in setup and/or negotiation messages for a peer-to-peer communication session. Further, committed availability may refer to committed (e.g., previously scheduled) time windows and channels for receiving communications. In some implementations, if device 501X accepts the counter proposal for the schedule, either partially or entirely, it may respond with a schedule confirm message 516 that may include device 501X's committed availability. The accepted portion of the counter proposal for the schedule may become device 501N's committed availability schedule. Device 501N may then send one or more new beacon/publish messages 520 that include device 501N's committed availability and potential availability.

A second device, e.g., device 501Z, may transmit a schedule request 522 and include device 501Z's conditional and potential availability. In some implementations, if device 501N determines to establish a datapath with device 501Z, but needs to change its existing committed schedule to accommodate the device 501Z's potential (e.g., by adjusting it's own potential availability schedule to coincide with and/or not conflict with 501Z's potential availability) and conditional availability schedules, the device may first update existing peers (e.g. device 501X) with one or more new committed schedules. For example, device 501N may transmit a schedule update message 524 to device 501X that includes device 501N's updated committed availability for device 501X, potential availability, and an effective time 526. Once the update becomes effective (e.g., at the effective time, 526), device 501N may then transmit a schedule response message 528 (e.g., a counter proposal for the schedule) to device 501Z that includes the device's conditional availability for device 501Z, committed availability for device 501Z, and potential availability. In some implementations, if device 501Z accepts the counter proposal for the schedule, either partially or entirely, the second device may respond with a schedule confirm message 530 that may include the device 501Z's committed availability.

Figures 6A, 6B:
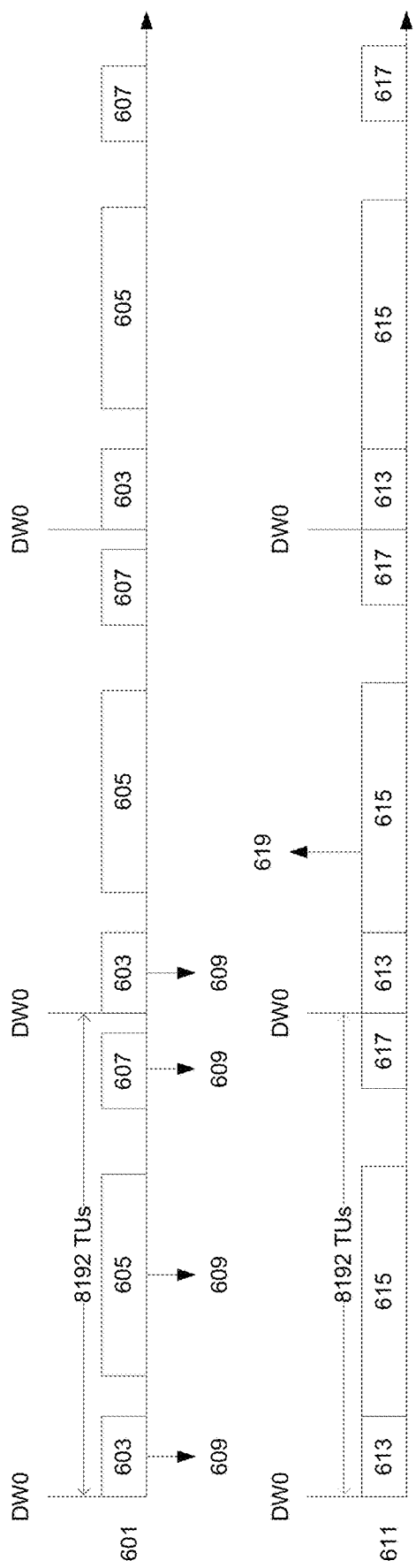
FIG. 6A illustrates an example of switching to a new schedule, according to implementations.
FIG. 6B illustrates an example of a NAN availability attribute that includes an effective time attribute, according to implementations.

In some implementations, device 501N may notify device 501X of the effective time via an additional parameter (effective time parameter 628, e.g., as illustrated by FIG. 6B) in a NAN availability attribute 620. Such a parameter, together with the NAN availability attribute 620, may allow for flexible indications of a new schedule for a future DWS interval and its effective time at any future time point.

For example, as illustrated by FIG. 6A, both the current schedule 601 (including entries 603, 605, and 607) and the new schedule 611 (including entries 613, 615, and 617) can be announced via signaling 609, e.g., by using two NAN availability attributes 620, before the new schedule becomes effective at 619. However, such implementations add overhead for all peers in communication with the announcing device, as the peers must record both the current schedule 601 and the new schedule 611 for the announcing device and further, switch, at the indicated effective time 619, to the new schedule 611.

In some embodiments, a device, such as client station 106, may announce (broadcast, transmit, send) an intention to change (migrate or transition) from a current (or existing) availability schedule to a new communication schedule, e.g., by publishing an update to the current schedule. Note that peer devices may only record the device's schedule for the current discovery window schedule (DWS) interval, and may replace the schedule whenever an update is received from the device. The announcement may be via a discovery beacon and/or a publish message, and may be unicast or multicast. The new schedule effective time may be within a current DWS interval or in a subsequent DWS interval.

Figure 7:
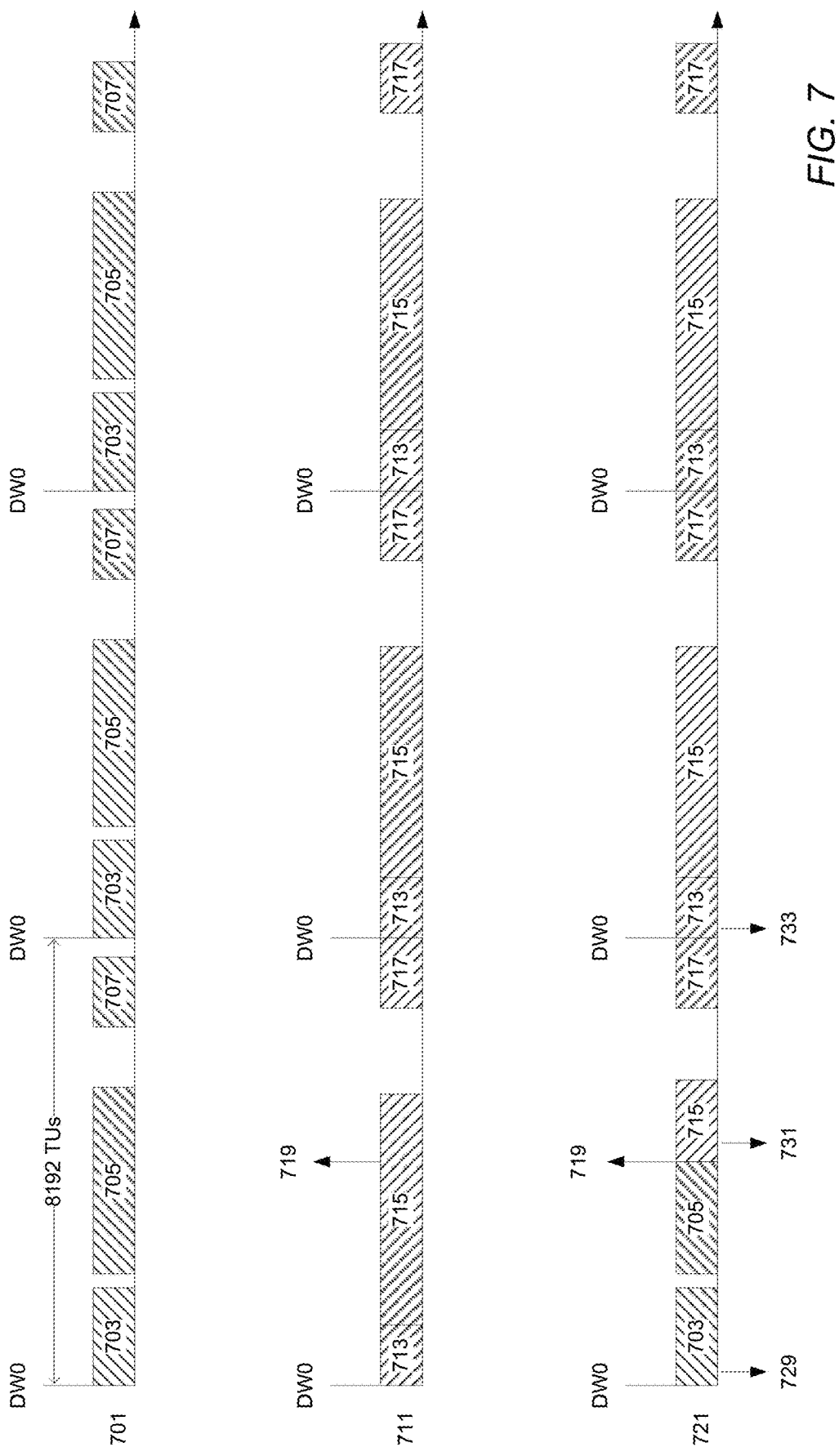
FIG. 7 illustrates an example of migrating from a current schedule to a new schedule when the new schedule is effective in a current discovery window interval, according to some embodiments.

For example, as illustrated by FIG. 7, if the effective time 719 is within the current DWS interval, the device may announce a schedule update (e.g., via discovery beacon and/or publish message 729) within the current DWS interval, e.g., by maintaining the current availability schedule 701 (including entries 703, 705, and 707) before the effective time 719, but indicating that the current availability schedule 701 will not repeat and replacing the current availability schedule 701 after the effective time 719 with a corresponding portion of the new schedule 711 (including entries 713, 715, and 717), e.g., as illustrated by migration schedule 721. Additionally, at a subsequent start of a discovery window schedule interval, the device may continue to announce the new communication schedule (e.g., the device's updated availability schedule) 711 via discovery beacon and/or publish message 733. In other words, once the new schedule 711 becomes effective at 719, the device may announce another schedule update 731 to replace the availability schedule 701 for the entire DWS interval with the new schedule 721. Further, the device can make the new schedule 721 repeat in one or more subsequent DWS intervals. In addition, the device may continue announcing the new schedule, e.g., via discovery beacon and/or publish message 733, at the beginning of subsequent DWS intervals to ensure all peers receive the new schedule correctly.

Figure 8:
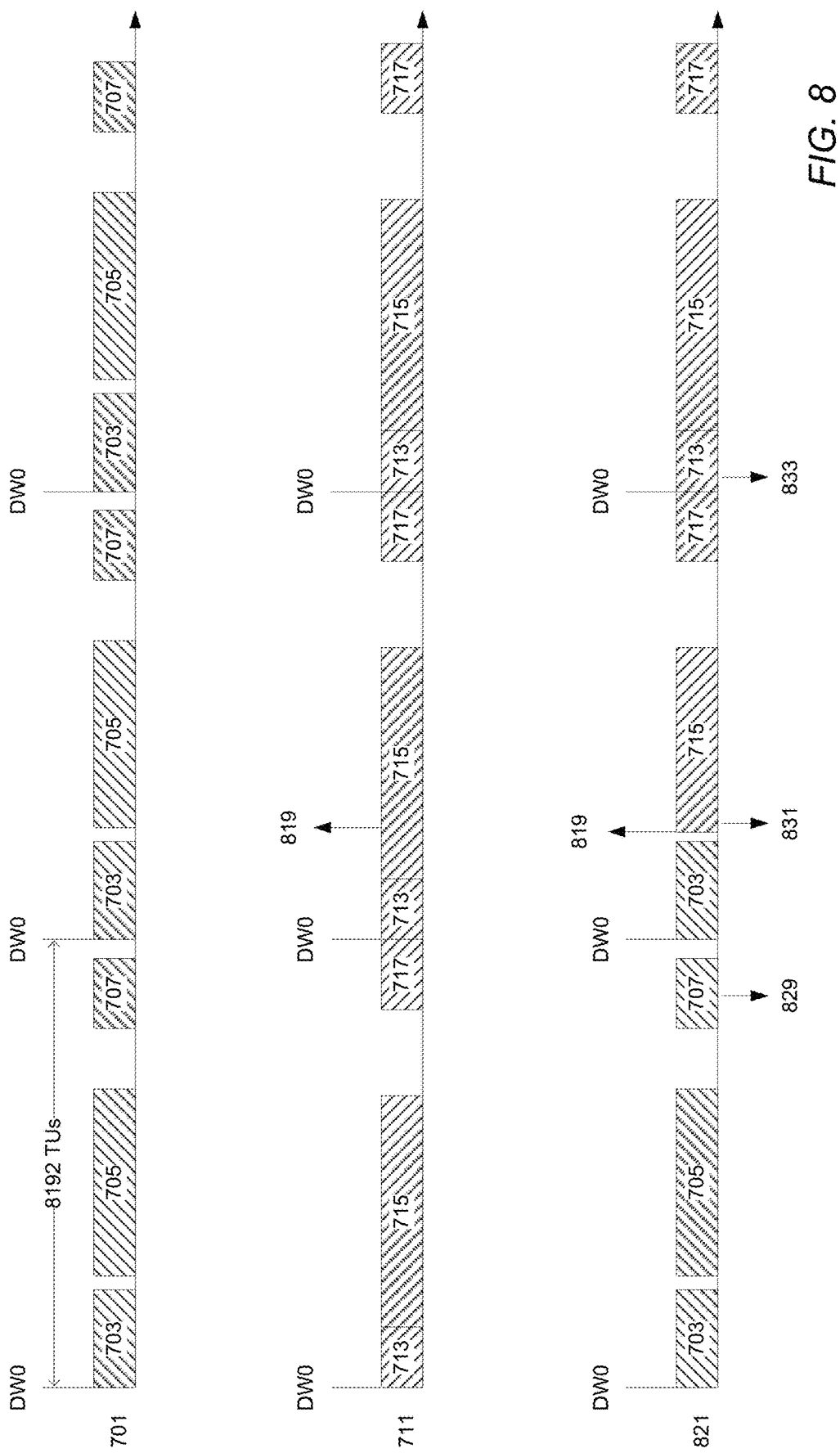
FIGS. 8-9 illustrate examples of migrating from a current schedule to a new schedule when the new schedule is effective in a subsequent discovery window interval, according to some embodiments.

In some embodiments, as illustrated by FIG. 8, if the effective time 819 is in a subsequent DWS interval, the device may announce a schedule update (e.g., via discovery beacon and/or publish message 829) for the current DWS interval and a subsequent DWS interval, e.g., by maintaining the currently availability schedule 701 prior to the effective time 819, but indicating that the current availability schedule 701 will not be repeated and replacing the current availability schedule 701 after the effective time 819 with a corresponding portion of the new availability schedule 711, e.g., as illustrated by migration schedule 821. At the effective start time 819, the device may switch to the new schedule 711 for the remainder of the subsequent DWS interval. In addition, the device may announce another schedule update (e.g., via discovery beacon and/or publish message 831) to replace the availability schedule 701 for the entire DWS interval with the new schedule 711 and make the new schedule 711 repeat in one or more subsequent DWS intervals. Additionally, the device may continue announcing the new communication schedule 711 in further subsequent DWS intervals (e.g., via discovery beacon and/or publish message 833) to ensure all peers receive the new schedule 711 correctly.

In some embodiments, a time window parameter may be extended to include multiple DWS intervals (e.g., up to 16,384 TUs). Thus, the start offset may be extended, e.g., to indicate up to 16,384 TUs and a time bitmap length may be allowed to indicate up to 128 octets. Thus, if the effective time is in a subsequent DWS interval, the device may indicate portions of both the current schedule and the new schedule, spanning two or more DWS intervals, by using one NAN availability attribute.

Figure 9:
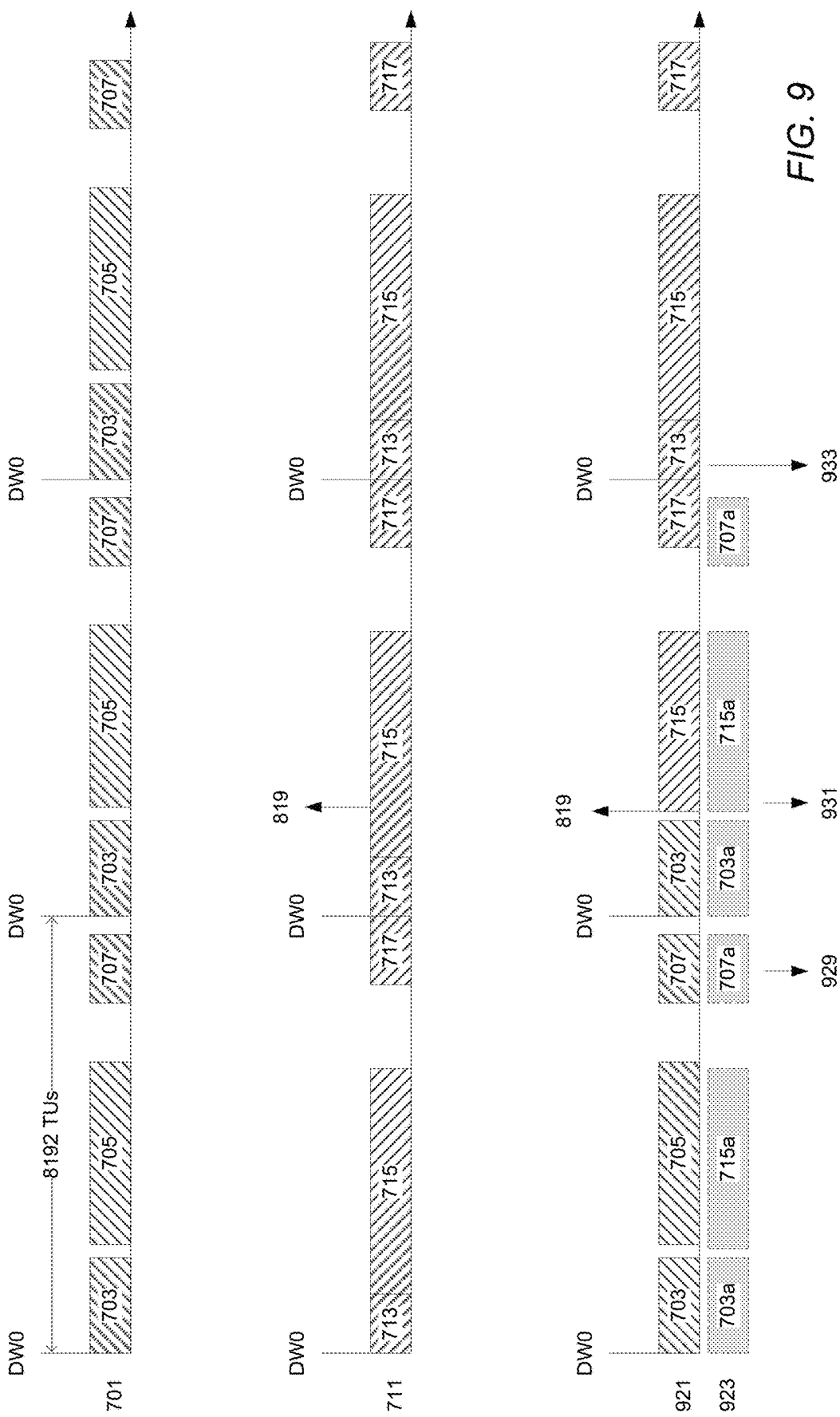

In some embodiments, as illustrated by FIG. 9, if the effective time 819 is in a subsequent DWS interval, the device may announce a schedule update (e.g., discovery beacon and/or publish message 929) within the current DWS interval by maintaining the current availability schedule 701 after the announcement time (until the end of the DWS interval) and indicating that the current availability schedule 701 will not repeat. Additionally, the device may replace the current availability schedule 701 between the DWS interval starting time and the announcement time with a corresponding portion of the current availability schedule expected in a subsequent DWS interval (which includes a portion of current schedule until new schedule effective time and a portion of new schedule after the effective time) as illustrated by migration schedule 923. The updated availability schedule between the DWS interval starting time and the announcement time is set to "repeating" in the subsequent DWS interval such that peers can continue to follow the current availability schedule 701 until the new schedule effective time in the subsequent DWS interval. At the effective time, the device may switch to the new availability schedule 711 for the remainder of the subsequent DWS interval as illustrated by migration schedule 921. In addition, the device may announce another schedule update (e.g., via discovery beacon and/or publish message 931) to replace the availability schedule for the entire DWS interval with the new availability schedule 711 and indicate that the new availability schedule 711 will be repeated in subsequent DWS intervals. Additionally, the device may continue announcing the new communication schedule 711 (e.g., via discovery beacon and/or publish message 933) in one or more further subsequent DWS intervals to ensure peers receive the new schedule correctly.

Figure 10:
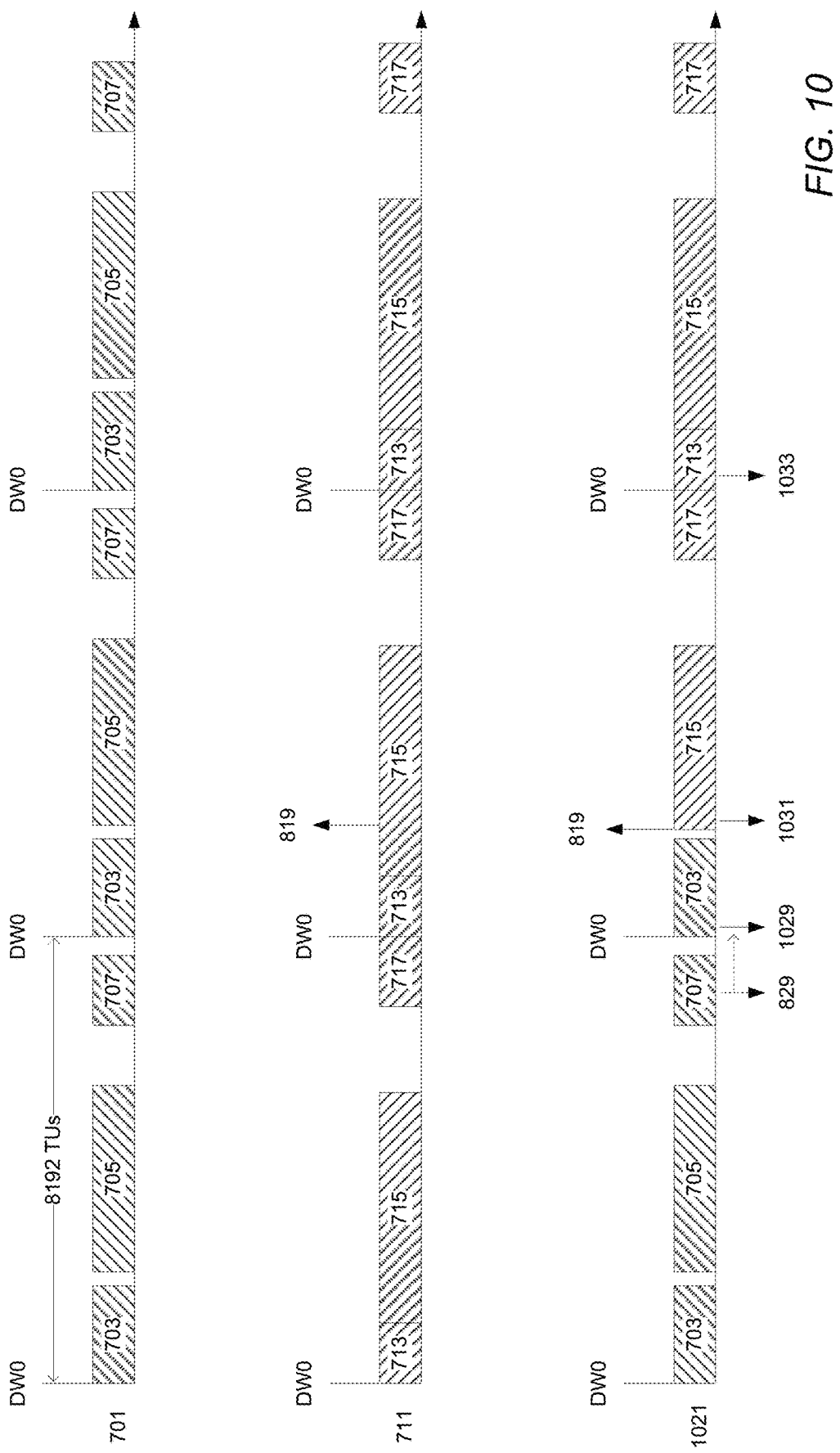
FIG. 10 illustrates an example of migrating from a current schedule to a new schedule by deferring announcement of the new schedule, according to some embodiments.

In some embodiments, as illustrated by FIG. 10, if the new schedule effective time 819 is in a subsequent DWS interval, the device may defer announcement (e.g., beacon and/or publish message 829) of the new availability schedule 711 until the start of the subsequent DWS interval, e.g., via beacon and/or publish message 1029 as illustrated by migration schedule 1021. The schedule migration operation then becomes the same as that illustrated by FIG. 7. In addition, the device may update the current schedule as having a period of zero (e.g., no repeating), which may prompt peer devices to obtain new schedule information at the start of the subsequent DWS interval. Further, at the new schedule effective time, the device may switch to the new schedule for the remainder of the subsequent DWS interval. The device may then announce a schedule update (e.g., beacon and/or publish message 1031) to replace the schedule for the whole DWS interval with the new schedule 711, and make the new schedule repeat in one or more subsequent DWS intervals. Additionally, the device may continue announcing the new communication schedule 711 (e.g., via discovery beacon and/or publish message 1033) in further subsequent DWS intervals to ensure peers receive the new schedule correctly.

Figure 11:
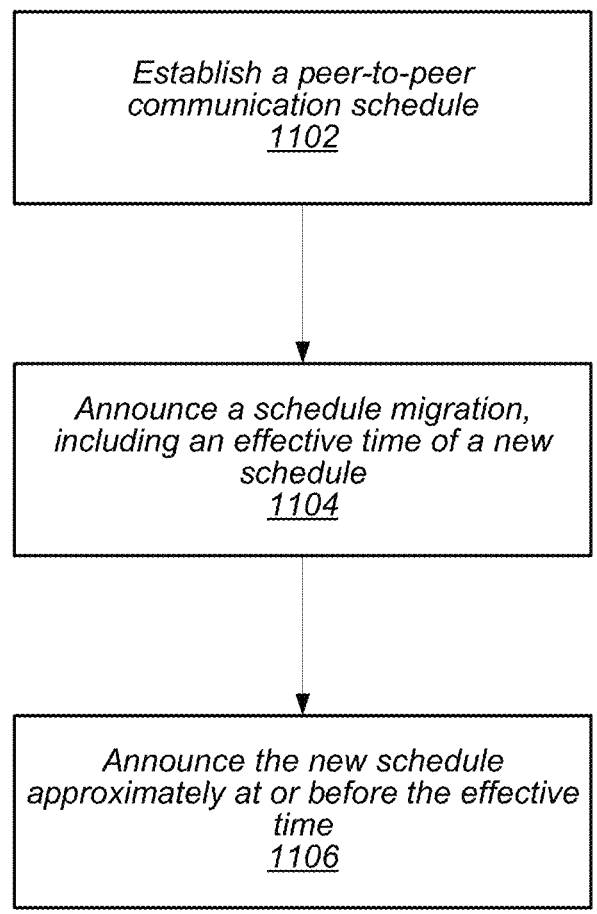
FIG. 11 illustrates a block diagram of an example of a method for migrating from a current schedule to a new schedule, according to some embodiments.

FIG. 11 illustrates a block diagram of an example of a method for migrating from a current schedule to a new schedule, according to some embodiments. The method shown in FIG. 11 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1102, a device, such as client station 106 may establish a peer-to-peer communication schedule with a neighboring device, which may also be a client station 106. In some embodiments, the device may communicate with the neighboring peer device according to the communication schedule, which may have been previously negotiated. In some embodiments, the communication schedule may be an availability schedule and the availability schedule may specify times and channels for communications with the neighboring peer device.

At 1104, the device may announce a schedule migration. The announcement may include an effective time of a new schedule. In some embodiments, the device may transmit an intention to change a negotiated schedule and the intention (or message than includes the intention) may include the effective time of the new schedule. In some embodiments, the device may broadcast the effective time of the new schedule. In some embodiments, the effective time of the new schedule may occur within a current discovery window schedule (DWS) interval, e.g., which may include 8,192 time units. In some embodiments, the effective time of the new schedule may occur in a subsequent DWS interval. In such embodiments, the new schedule may include a first portion and a second portion. In some embodiments, the first portion may include a time period from a start of a subsequent DWS interval to the effective time and may correspond to the peer-to-peer communication schedule from the start of the subsequent DWS interval to the effective time. In some embodiments, the first portion may include a time period from a start of a current DWS interval to the effective time and may correspond to the peer-to-peer communication schedule from the start of the current DWS interval to the effective time. In some embodiments, the second portion may correspond to the new schedule from the effective time to the end of the subsequent discovery window schedule interval.

At 1106, the device may announce the new schedule approximately at or before the effective time of the new schedule. In some embodiments, the announcement may be configured as or included in a broadcast or unicast message. In some embodiments, the device may continue to announce the new schedule after the effective time of the new schedule to inform new neighboring peer devices (e.g., peer devices that may come within communication range of the device after the effective time) of the new schedule.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
at least one antenna;
at least one radio in communication with the at least one antenna and configured to perform communications via a Wi-Fi interface; and
at least one processor in communication with the at least one radio;
wherein the at least one processor is configured to cause the wireless device to:
establish a peer-to-peer communication schedule with at least one neighboring peer device, wherein the communication is conducted according to a Wi-Fi peer-to-peer communication protocol;
announce, to the at least one neighboring peer device, a schedule migration, wherein the schedule migration includes an effective time of a new schedule; and
announce, to the at least one neighboring peer device, the new schedule at or before the effective time.

2. The wireless device of claim 1,
wherein the effective time of the new schedule occurs within a current discovery window schedule interval.

3. The wireless device of claim 1,
wherein the effective time of the new schedule does not occur within a current discovery window schedule interval.

4. The wireless device of claim 3,
wherein the new schedule comprises a first portion and a second portion, and wherein the second portion corresponds to the new schedule from the effective time to the end of a subsequent discovery window schedule interval.

5. The wireless device of claim 4,
wherein the first portion comprises a time period from a start of a subsequent discovery window schedule interval to the effective time, wherein the first portion corresponds to the peer-to-peer communication schedule from the start of the subsequent discovery window interval to the effective time.

6. The wireless device of claim 4,
wherein the first portion comprises a time period from a start of the current discovery window schedule interval to the effective time, wherein the first portion corresponds to the peer-to-peer communication schedule from a start of the current discovery window schedule interval to the effective time.

7. The wireless device of claim 1,
wherein a discovery window schedule interval includes sixteen discovery windows, wherein each discovery window comprises one sixteenth of a discovery window schedule interval.

8. An apparatus, comprising:
a memory; and
at least one processor in communication with the memory;
wherein the at least one processor is configured to:
communicate with at least one neighboring peer device according to a negotiated schedule, wherein the communication is according to a Wi-Fi peer-to-peer communication protocol;
transmit, to the at least one neighboring peer device, an intention to change the negotiated schedule indicating an effective time of a new schedule; and transmit, to the at least one neighboring peer device, the new schedule at or before the effective time.

9. The apparatus of claim 8,
wherein the effective time of the new schedule occurs within a current discovery window schedule interval.

10. The apparatus of claim 8,
wherein the effective time of the new schedule does not occur within a current discovery window schedule interval.

11. The apparatus of claim 10,
wherein the new schedule comprises a first portion and a second portion, and wherein the second portion corresponds to the new schedule from the effective time to the end of a subsequent discovery window schedule interval.

12. The apparatus of claim 11,
wherein the first portion comprises a time period from a start of a subsequent discovery window schedule interval to the effective time, wherein the first portion corresponds to the peer-to-peer communication schedule from the start of the subsequent discovery window interval to the effective time.

13. The apparatus of claim 11,
wherein the first portion comprises a time period from a start of the current discovery window schedule interval to the effective time, wherein the first portion corresponds to the peer-to-peer communication schedule from a start of the current discovery window schedule interval to the effective time.

14. The apparatus of claim 8,
wherein a discovery window schedule interval includes sixteen discovery windows, wherein each discovery window comprises one sixteenth of a discovery window schedule interval.

15. A non-transitory computer readable memory medium storing program instructions executable by a processor to:
communicate with one or more neighboring peer devices according to an availability schedule, wherein the availability schedule specifies one or more times and channels for communications with the one or more neighboring peer devices;
broadcast to the one or more neighboring peer devices an effective time of a new schedule; and
broadcast to the one or more neighboring peer devices the new schedule at or before the effective time.

16. The non-transitory computer readable memory medium of claim 15,
wherein the effective time of the new schedule occurs within a current discovery window schedule interval.

17. The non-transitory computer readable memory medium of claim 15,
wherein the effective time of the new schedule does not occur within a current discovery window schedule interval.

18. The non-transitory computer readable memory medium of claim 15,
wherein the new schedule comprises a first portion and a second portion, and wherein the second portion corresponds to the new schedule from the effective time to the end of the subsequent discovery window schedule interval.

19. The non-transitory computer readable memory medium of claim 18,
wherein the first portion comprises a time period from a start of a subsequent discovery window schedule interval to the effective time, wherein the first portion corresponds to a peer-to-peer communication schedule from the start of the subsequent discovery window interval to the effective time.

20. The non-transitory computer readable memory medium of claim 18,
wherein the first portion comprises a time period from a start of a current discovery window schedule interval to the effective time, wherein the first portion corresponds to the peer-to-peer communication schedule from a start of the current discovery window schedule interval to the effective time.

* * * * *